United States Patent [19]

Peacey

[11] Patent Number: 4,981,674
[45] Date of Patent: Jan. 1, 1991

[54] PRODUCTION OF ANHYDROUS MAGNESIUM CHLORIDE

[75] Inventor: John G. Peacey, Lancaster, Canada
[73] Assignee: Noranda, Inc., Toronto, Canada
[21] Appl. No.: 388,408
[22] Filed: Aug. 2, 1989

Related U.S. Application Data

[63] Continuation-in-part of Ser. No. 283,983, Dec. 13, 1988, abandoned.

[51] Int. Cl.$^5$ .............................................. C01F 5/32
[52] U.S. Cl. ................................................ 423/498
[58] Field of Search ..................... 423/498, DIG. 12

[56] References Cited

U.S. PATENT DOCUMENTS

| | | | |
|---|---|---|---|
| 3,067,006 | 12/1962 | Ebert et al. | 423/498 |
| 3,114,611 | 12/1963 | Ross | 423/DIG. 12 |
| 3,742,100 | 6/1973 | Boyam et al. | 264/13 |
| 3,953,574 | 4/1976 | Toomey | 423/178 |
| 4,039,648 | 8/1977 | Haupin et al. | 423/496 |
| 4,041,136 | 8/1977 | Franklin et al. | 423/DIG. 12 |
| 4,269,816 | 5/1981 | Shackleton | 423/498 |
| 4,302,433 | 11/1981 | Stein | 423/498 |
| 4,510,029 | 4/1985 | Neelameggham et al. | 204/130 |

OTHER PUBLICATIONS

Beck et al., Ser. No. 393,258 (by Alien Property Custodian), Published 7-13-43.

Primary Examiner—Jeffrey E. Russel
Assistant Examiner—Brian M. Bolam
Attorney, Agent, or Firm—Fleit, Jacobson, Cohn, Price, Holman & Stern

[57] ABSTRACT

A process for the preparation of anhydrous magnesium chloride containing acceptable amounts of MgO suitable for use in the electrolytic production of magnesium metal comprises the steps of feeding spray-dried magnesium chloride powder, or a magnesite or magnesia powder to a furnace containing a molten magnesium chloride melt at a temperature of about 750°-850° C., and reacting the melt with a carbonaceous reductant and chlorine. The gases are introduced using a gas disperser consisting of a rotating vaned impeller with a tube in the center of the impeller to create gas bubbles having a diameter smaller than 5 nm and having a gas hold-up as high as 30% of the original melt volume, and also ensure that the fine particles present in the melt are evenly suspended.

2 Claims, 2 Drawing Sheets

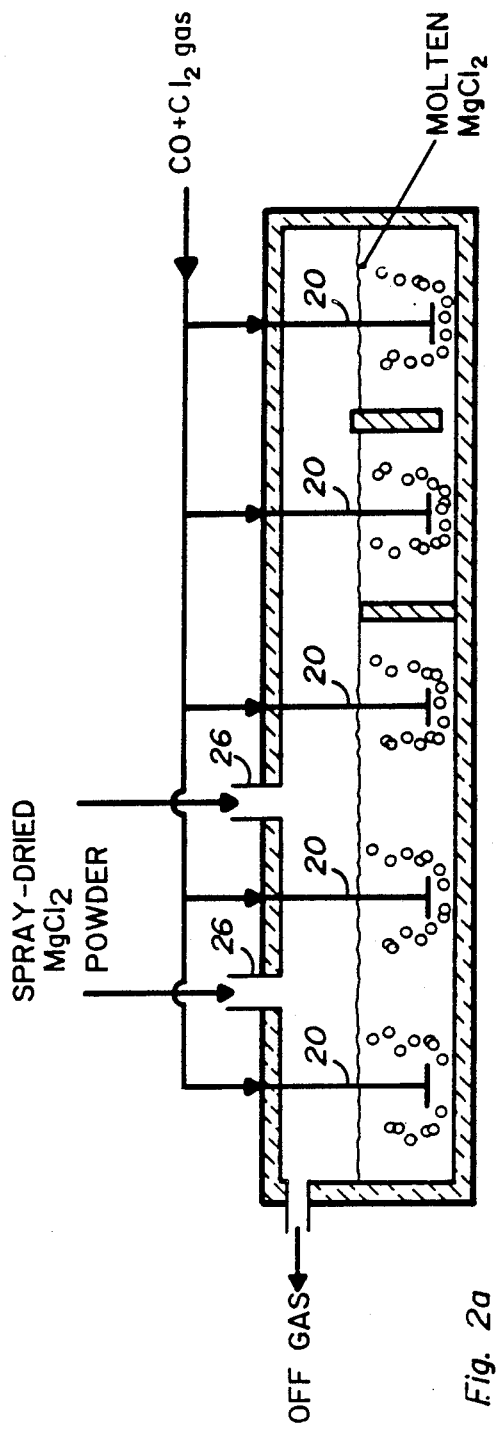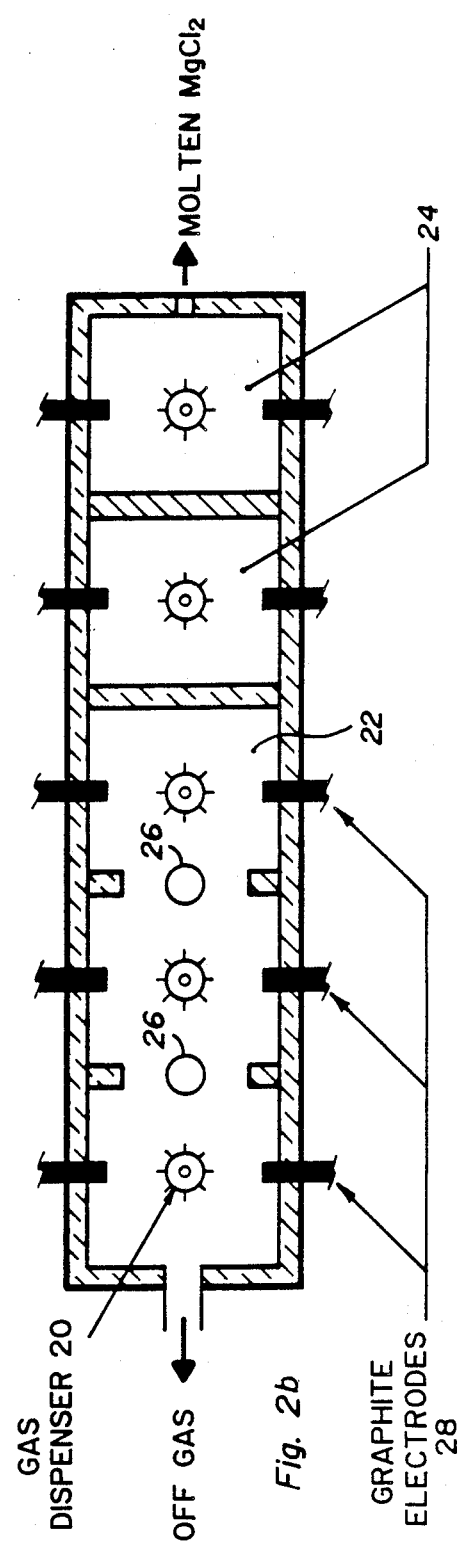

PRODUCTION OF ANHYDROUS MAGNESIUM CHLORIDE

This is a continuation-in-part of U.S. applicated No. 283,983 filed Dec. 13, 1988, now abandoned.

This invention relates to the production of anhydrous magnesium chloride from spray-dried magnesium chloride powder, or magnesite or magnesia powders.

A key step in the production of magnesium metal by electrolysis of magnesium chloride is the preparation of the anhydrous magnesium chloride feed. The anhydrous magnesium chloride feed to the electrolysis cell must contain very low amounts of MgO, otherwise there will be excessive consumption of the graphite anodes and formation of sludge in the bottom of the cell that will eventually impair cell operation if it is not removed periodically. In addition, the most modern magnesium electrolysis cells, such as the Alcan multipolar cell, are very tightly sealed and are designed such that anodes cannot be changed or the cell desludged without closing down the cell. Thus, it is even more critical that the anhydrous magnesium chloride feed to such cells contains very little MgO, in this case preferably less than 0.2% MgO by weight.

Several processes are used commercially to produce anhydrous $MgCl_2$. The oldest is the IG Farben process, in which briquettes of MgO and coke are reacted with chlorine in an electrically heated vertical shaft furnace to produce molten magnesium chloride at about 800° C. The main drawbacks to this process are: its low productivity (less than 30 tpd of molten $MgCl_2$ per furnace), the need for periodic shutdowns to remove unreacted residue from the bottom, high chlorine requirements, and the presence of chlorinated hydrocarbons in the exhaust gases. More recently, a new shaft furnace chlorination process has been developed by Mineral Process Licensing Corp. (Can. Pat. No. 1,128,288) that produces molten anhydrous magnesium chloride directly from lump magnesite ore using carbon monoxide as the reductant. This process has the advantage of eliminating the magnesite to MgO calcination and MgO/coke briquetting steps but it requires a very pure magnesite feed to make acceptable quality Mg metal, and it still has not resolved the remaining drawbacks of the IG Farben chlorinator; namely, low productivity and chlorinated hydrocarbon emissions.

Norsk Hydro has developed a new process for producing anhydrous magnesium chloride prills from concentrated magnesium chloride brines. This process is described in U.S. Pat. No. 3,742,100 and consists of the following unit operations:
 (1) Evaporation of $MgCl_2$ brine to a concentration of up to 55% $MgCl_2$.
 (2) Prilling of the concentrated $MgCl_2$ brine to form prills of $MgCl_2z.4-6$ $H_2O$ of suitable size for fluidized bed processing.
 (3) Fluidized bed dehydration with air at 200° C. to produce $MgCl_2.2H_2O$ powder.
 (4) Three-stage fluidized bed dehydration with anhydrous HCl gas at about 300° C. to give anhydrous magnesium chloride powder containing less than 0.2% each by weight of MgO and $H_2O$.

This process is operating commercially in Norway but it is very complex and capital intensive.

Amax Magnesium in Rowley, Utah produce molten magnesium chloride by reacting spray-dried magnesium chloride powder, containing about 5% by weight each of MgO and $H_2O$, with a solid carbonaceous reductant and chlorine gas at a temperature of about 800° C. This process is described in U.S. Pat. No. 3,953,574. The process is carried out in two in-series rectangular furnaces, heated electrically via A.C. graphite electrodes installed in the furnace walls. Spray-dried $MgCl_2$ is fed together with a solid carbon reductant into the first furnace and chlorine gas is bubbled through both furnaces using graphite lances to react the MgO and $H_2O$ in the feed to $MgCl_2$ and HCl, respectively. The final $MgCl_2$ melt contains less than 0.5% MgO. However, Amax has found that in order to obtain sufficiently high chlorine utilization efficiencies it was necessary to provide ferrous chloride to the melt, either by adding an iron metal or oxide to the chlorination furnace or, preferably, by adding ferrous chloride solution to the $MgCl_2$ brine before spray drying. Without such iron additions, chlorine efficiencies of less than 40% were achieved, which would be too low for a commercial process. However, the use of iron results in several process drawbacks, in addition to its added cost, namely:
 (a) the residual iron level of 0.5% in the product $MgCl_2$ melt decomposes in the electrolytic cell to iron metal that accumulates as a sludge and causes losses in cell operating efficiency,
 (b) part of the iron added volatilizes causing stack emission problems.

The residual iron level in the $MgCl_2$ product from the Amax process is too high for use in modern, "sealed" electrolysis cells and therefore Amax has had to develop a novel bipolar pre-electrolysis operation to remove the iron level down to less than 0.1% Fe in order to use its $MgCl_2$ as a feed to such cells. This is described in U.S. Pat. No. 4,510,029.

Applicant has found that the low chlorine utilization efficiency obtained with graphite lances as used by Amax for chlorine injection is because such lances produce coarse bubbles ($>1$ cm in diameter) and little gas hold-up within the melt ($<5\%$ of the melt volume). Therefore, lances do not create sufficient interfacial contacting area between the MgO and carbon particles and the chlorine gas bubbles to produce a rapid, efficient reaction.

It is therefore the object of the present invention to provide a new process for producing anhydrous magnesium chloride from spray-dried $MgCl_2$ powder that eliminates the need to use iron or $FeCl_2$ to achieve high chlorination efficiencies.

It is also an object of the present invention to provide a process which is applicable to:
 (1) upgrading anhydrous magnesium chloride from other processes to produce a product containing acceptable amounts of MgO.
 (2) producing anhydrous magnesium chloride directly from magnesite or magnesia powders.

The process in accordance with the present invention comprises the steps of feeding spray-dried magnesium chloride powder, or a magnesite or magnesia powder to a furnace containing a molten magnesium chloride melt at a temperature of about 750°–850° C., and reacting the melt with a carbonaceous reductant and chlorine. The gases are introduced through a gas disperser consisting of a rotating vaned impeller with a tube in the center of the impeller to create gas bubbles having a diameter smaller than 5 mm and a gas hold-up as high as 30% of the original melt volume, and also ensure that the particles present in the melt are maintained in suspension.

The preferred carbonaceous reductant is carbon monoxide as this introduces no deleterious impurities into the melt. The carbon monoxide would be introduced together with the chlorine through the gas disperser. Solid finely-divided carbonaceous reductants, such as calcined coke and graphite, can also be used to partially or totally replace carbon monoxide. In this case, the levels of deleterious impurities, such as nickel, chromium must be carefully controlled if high-purity magnesium metal is to be produced from the resulting magnesium chloride melt. Normally a solid carbonaceous reductant would be added in a similar manner to the spray-dried $MgCl_2$ powder.

The furnace is preferably a multistage furnace having a melt section consisting of interconnected stages followed by a multistage reduction section. The gas flow in the furnace is preferably countercurrent to the melt flow to achieve maximum utilization of the injected gases. Each section is provided with at least one gas disperser. The disperser is a rotatable vaned impeller having an axial passage extending therethrough and a plurality of blades extending radially outward from one end of said tube, the gas disperser being positioned in the furnace such that the plurality of blades are located in the molten magnesium chloride melt.

The invention will now be disclosed by way of example, with reference to the following examples and to the accompanying drawings in which:

FIGS. 2a and 2b show sectional side and top views of a chlorinator used to carry out the process in accordance with the invention.

Figure 1:
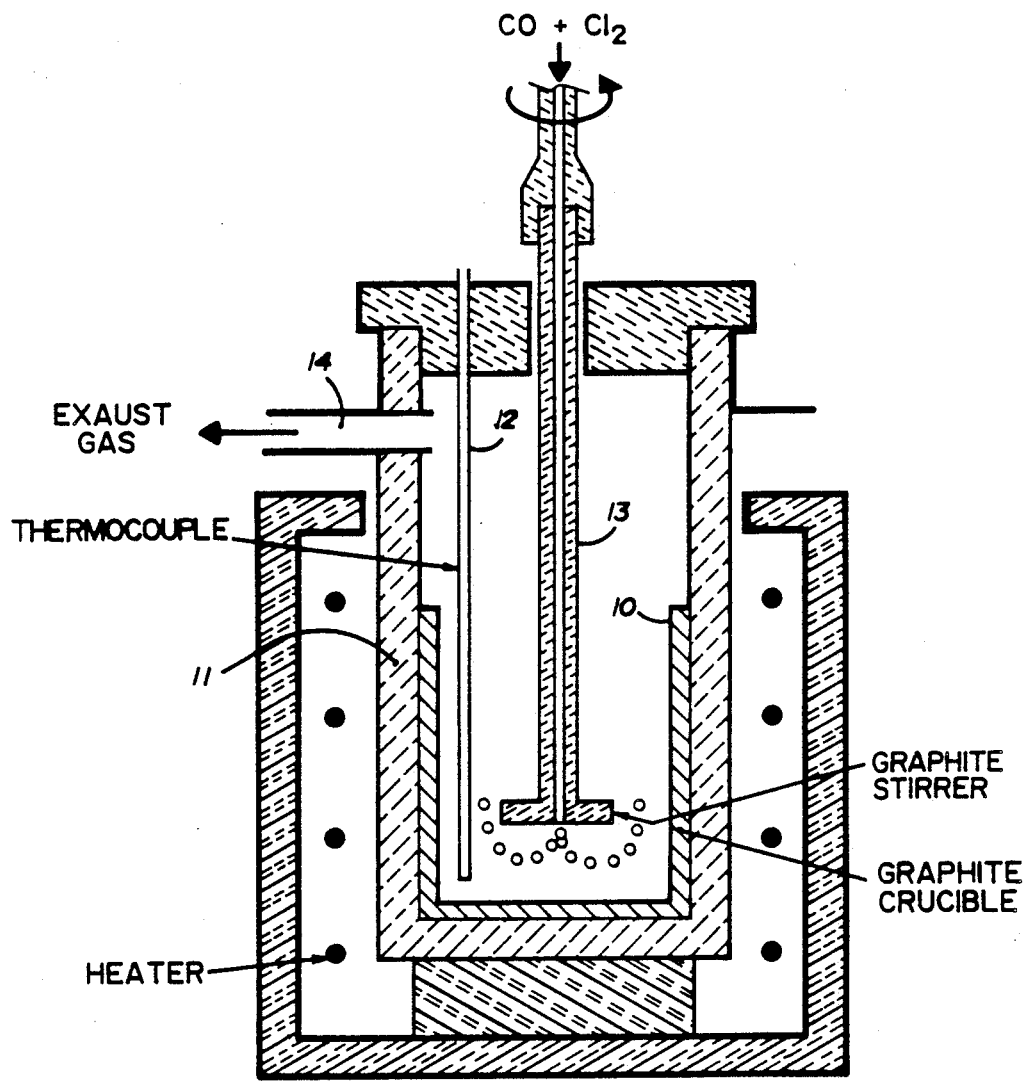
FIG. 1 shows the equipment used in laboratory chlorination tests.

Referring to FIG. 1 blended, $MgCl_2$ powder, produced from spray-dried $MgCl_2$ and of known MgO content, was loaded into a graphite crucible 10 located in a clay-graphite enclosure 11 and melted under a $N_2$ atmosphere. A charge weight of 6 kg was used to give a melt volume of about 3.6 L (6.5 in. diameter by 6.5 in. high). When the test temperature measured by thermocouple 12 was reached, usually in range 750°–820 °C., a six-bladed graphite stirrer 13, 2.5 in. diameter, Was inserted and started together with $CO/Cl_2$ injection through a 0.6 cm diameter tube drilled through the center of the impeller. Melt samples were taken periodically during the tests. A constant $CO/Cl_2$ gas flowrate, in the range 0.5–2.0 L/min., was used throughout each test and stirrer speeds in the range 300–800 rpm. The exhaust gases were removed from the crucible via a ceramic tube 14 and then sparged through water and caustic solution to remove HCl and $Cl_2$. At the end of each test the gas flow was stopped, the stirrer removed and the melt allowed to cool and solidify.

A typical test result is given in the following Table I.

TABLE I

| Test Conditions | |
|---|---|
| Melt Temperature | = 815° C. |
| CO, $Cl_2$ Flowrate | = 500 mL/min each, constant throughout test |

| TIME, min | % MgO | Calculated $Cl_2$ Utilization Efficiency % |
|---|---|---|
| 0 | 4.72 | — |
| 60 | 3.91 | 84.6 |
| 120 | 3.05 | 89.8 |
| 180 | 2.24 | 84.6 |
| 240 | 2.01 | 70.0 |
| 300 | 0.09 | 70.0 |
| 360 | 0.37 | 55.4 |
| 420 | 0.14 | 24.0 |
| 480 | 0.026 | 11.9 |
| 540 | 0.008 | — |

Average $Cl_2$ utilization efficiency = 46.6% over whole test.

Initially, when the MgO level in the molten $MgCl_2$ bath is relatively high (above 1% MgO), the chlorine utilization efficiency is very high, up to 90%, especially considering the small size of the laboratory reactor. Chlorine utilization efficiency decreases steadily as the MgO level falls to values of about 20% at 0.1% MgO in the melt. The overall average $Cl_2$ utilization efficiency for this test was 46.6%. If the CO and $Cl_2$ gas flowrates are reduced proportionately as the MgO level falls below 1% MgO, then the overall $Cl_2$ utilization is increased to over 70%.

The stirrer design and speed used in this test was not considered to be the optimum but it still showed that MgO levels less than 0.01% can be achieved at a high chlorine utilization efficiency.

Water model studies have shown that the rotating vaned impeller used in the above tests typically produced gas bubbles with a diameter in the range 2–3 mm in diameter. The impeller disperses the gas bubbles in the melt to create a gas hold-up as high as 30% of the original melt volume. This creates a very large interfacial contacting area between the gas bubbles and the melt and produces a rapid efficient reaction. The relationship between interfacial area and gas bubble diameter and gas hold-up can be represented by the equation: Interfacial area = 6 × fractional volumetric hold-up/mean bubble diameter.

When the same test was carried out with chlorine and carbon monoxide gases sparged through a 0.6 cm diameter quartz tube, very little reaction occurred. The gas bubbles produced were estimated to be about 1 cm in diameter and the gas hold-up in the melt was very low thus giving a much smaller interfacial contacting area compared to the vaned impeller. Thus the MgO level in the melt was still above 4% MgO after several hours.

Further test results showing the effect of gas flowrate and melt temperature on the reaction rate and chlorine utilization efficiency are given in the following Table II.

TABLE II

| | | Batch Test Results | | | | | |
|---|---|---|---|---|---|---|---|
| TEST NO | TEMP °C. | GAS FLOWRATES, ml/min | | TIME min | % MgO in $MgCl_2$ | | Average $Cl_2$ Efficiency, % |
| | | CO | $Cl_2$ | | Initial | Final | |
| 1 | 820 | 710 | 700 | 240 | 4.89 | 0.10 | 84.6 |
| 2 | 820 | 1100 | 1050 | 240 | 4.01 | 0.06 | 54.3 |
| 3 | 820 | 2020 | 2040 | 135 | 4.91 | 0.03 | 59.3 |
| 4 | 750 | 1020 | 1000 | 270 | 5.32 | 0.08 | 60.6 |

TABLE II-continued

| | | Batch Test Results | | | | |
|---|---|---|---|---|---|---|
| TEST NO | TEMP °C. | GAS FLOWRATES, ml/min CO | Cl$_2$ | TIME min | % MgO in MgCl$_2$ Initial | Final | Average Cl$_2$ Efficiency, % |
| 5 | 750 | 1800 | 1750 | 150 | 4.31 | 0.05 | 53.1 |

These tests were all carried out at a stirrer speed of 650 rpm, which was found to be the optimum for this vessel size and stirrer design. Temperature in the range 750° to 820° C. was found to have little effect. Average overall chlorine utilization efficiencies ranged from 85% at 700 mL/min to 50-60% at up to 2000 mL/min. Again these efficiencies would be much higher if the CO/Cl$_2$ flowrates were reduced as the MgO level falls and are high enough for a commerical process.

A commerical chlorinator to produce 8.5 mtph of anhydrous magnesium chloride, containing less than 0.1% MgO, is shown in FIGS. 2a and 2b. It is a multi-stage reactor, with each unit approximately 2.5 m L ×2.5 m W×2 m high with about a 1 metre melt depth and equipped with a special rotary gas disperser 20. the type of gas dispersers used in the commerical chlorinator are 30 -60 cm in diameter, larger than those currently used in the Aluminum Industry. The reactor has a melt/reaction section 22 consisting of 3 interconnected unit stages followed by a two-stage reduction section 24. A gas disperser is located in each stage and Co/Cl$_2$ is blown through the center of the impellers. The gas flow is countercurrent to the MgCl$_2$ flow.

8.2 mtph of spray-dried MgCl$_2$ powder (approximately 5% MgO, 5% H$_2$O) is continuously through feed ports 26 into the melting section 22 where most of the MgO and H$_2$O in the powder is reacted to MgCl$_2$ and HCl, respectively. Heat is provided to melt the magnesium chloride by A.C. powered graphite electrodes 28. CO and Cl$_2$ are injected into the melt section through several gas dispersion units at a total rate of about 2400 Nm$^3$/h each of CO and Cl$_2$. The level of MgO in the MgCl$_2$ melt leaving the melt section is less than 0.5%. The remaining MgO is reacted in two additional stages to ensure the final level of MgO in the molten MgCl$_2$ product is less than 0.1% MgO. The amount of CO and Cl$_2$ injected in the last two stages is very small, less than 50 Nm$^3$/h each of CO and Cl$_2$.

We claim:

1. A process for the preparation of anhydrous magnesium chloride containing less than 0.1% MgO suitable for use in the electrolytic production of magnesium metal comprising the steps of:
    (a) feeding spray-dried magnesium chloride powder, or magnesite or magnesia powder to a molten magnesium chloride bath contained in a furnace and maintained at a temperature of about 750°-850 ° C.;
    (b) providing a gas disperser in said furnace, said gas disperser being a rotatable vaned impeller comprising a tube having an axial passage extending therethrough and a plurality of blades extending radially outwardly from one end of said tube, said gas disperser being positioned in said furnace such that said plurality of blades are located within said molten magnesium chloride bath below the surface thereof;
    (c) creating gas bubbles with a diameter smaller than 5 mm in said bath and a gas hold-up as high as 30% of the original bath volume by introducing gaseous reactants into said bath through the tube of said gas disperser while rotating said vaned impeller, said gaseous reactants comprising chlorine and carbon monoxide; and
    (d) reacting the molten magnesium chloride bath with said carbon monoxide and chlorine.

2. A process as defined in claim 1, wherein a solid powdered carbonaceous material is introduced into said bath with the spray dried powder.

* * * * *